Nov. 3, 1953  A. J. FREI, SR  2,657,548
FREEZING PAN
Filed June 29, 1951  2 Sheets-Sheet 1
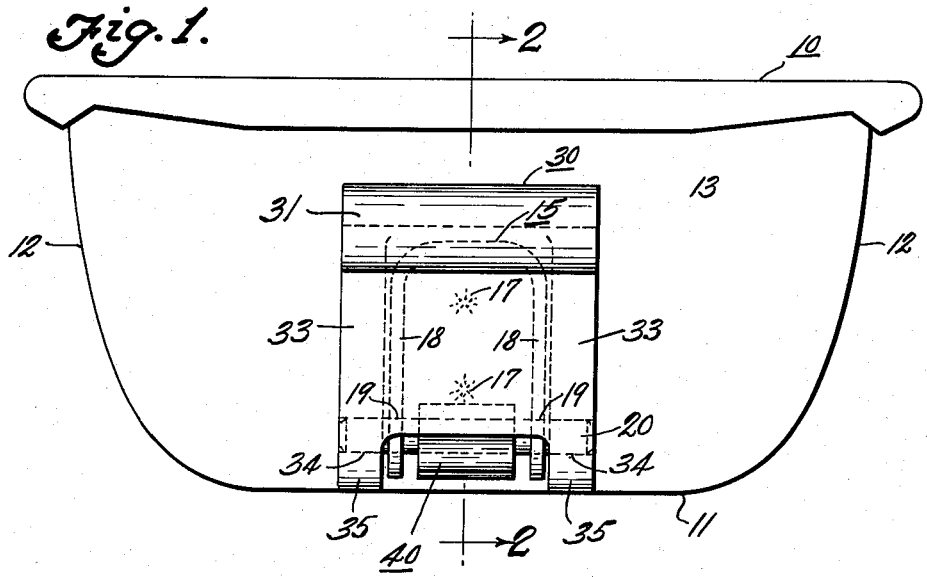
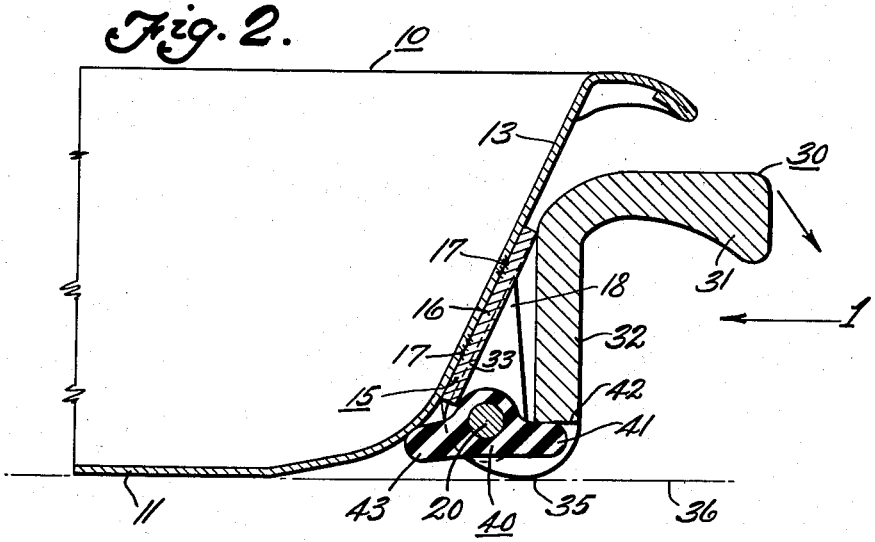
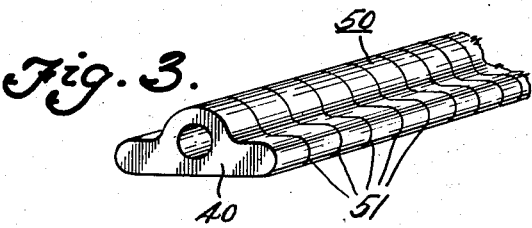
INVENTOR.
ARTHUR J. FREI, SR.
BY
Willits Hardman & Fehr
his ATTORNEYS

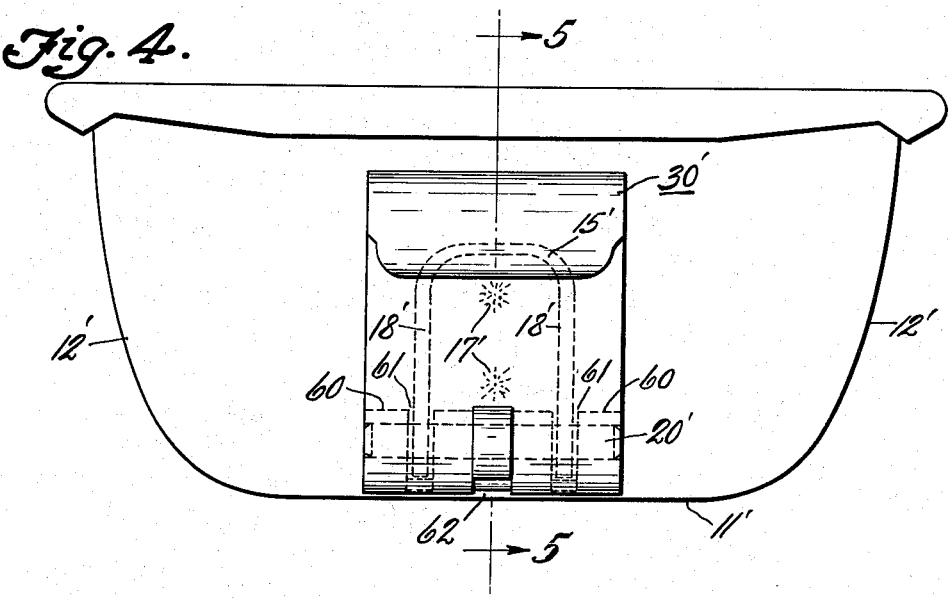
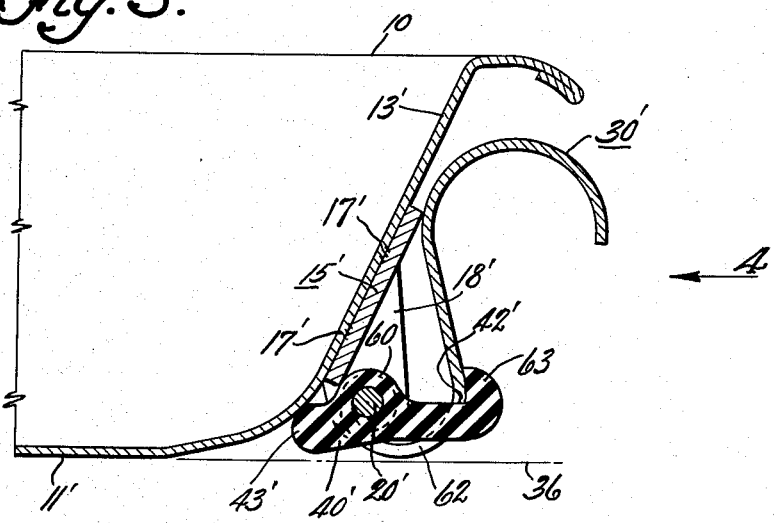
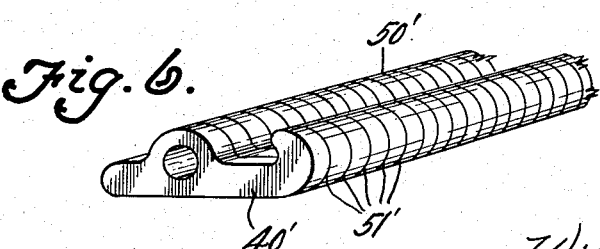

Patented Nov. 3, 1953

2,657,548

UNITED STATES PATENT OFFICE 2,657,548

FREEZING PAN

Arthur J. Frei, Sr., Dayton, Ohio, assignor to General Motors Corporation, Detroit, Mich., a corporation of Delaware Application June 29, 1951, Serial No. 234,314

3 Claims. (Cl. 62—108.5)

This invention relates to portable freezing pans especially such as are adapted for use in household refrigerators.

Such freezing pans when used to freeze ice cubes are usually set upon a flat horizontal metal shelf in the freezing compartment of a refrigerator, and the metal tray normally becomes ice-bonded to its support while freezing of its contents takes place. Various manually actuated camming handles have been used on such pans to force the pan loose from its support so that it may be easily withdrawn. But such camming handles are usually something of a nuisance after the pan is removed from its freezing shelf due to said handles hanging loosely downwardly and often in the way of other parts. This is especially true when it is desired to stack several such pans on top of each other to form a vertical stack of pans in the freezing compartment for storage or other purposes. In such cases the camming handles usually have no underneath support and hence dangle loosely downwardly and at least give a very poor appearance to the stack of pans.

Now an object of this invention is to provide a freezing pan having such a yieldably swung camming handle thereon for forcing the pan loose from its ice bond to its support, and having means for maintaining said handle in its normal non-camming position at all times other than while said handle is being used to force the pan loose from its ice bond to a supporting surface.

Another object is to provide such a device wherein said handle is so maintained in its normal position by a simple and economically made resilient member of resilient rubber (or similar rubber-like material) which can be very simply and quickly assembled upon the device when assembling the handle to the pan without requiring any additional parts.

Another object is to provide the resilient rubber member of such rectilinear shape that it may be very economically made by transversely cutting off relatively narrow sections from a long strip of constant cross section resilient rubber stock shaped by extruding same thru a correspondingly shaped extrusion aperture.

Further objects and advantages of the present invention will be apparent from the following description, reference being had to the accompanying drawings wherein a preferred embodiment of the present invention is clearly shown.

In the drawings:

Fig. 1 is an end elevation of a freezing pan and camming handle therefor made according to this invention.

Fig. 2 is a section taken on line 2—2 of Fig. 1.

Fig. 3 illustrates how the individual resilient rubber member of Figs. 1 and 2 may be made by cutting off relatively short sections from an extruded strip of resilient rubber stock of constant cross section.

Fig. 4 is an end elevation of a modified form of the invention.

Fig. 5 is a section taken on line 5—5 of Fig. 4.

Fig. 6 is similar to Fig. 3 and illustrates how the resilient rubber member of Figs. 4 and 5 may be very economically made by cutting off short sections from a relatively long strip of stock having a constant cross section.

Similar reference characters refer to similar parts thruout the drawings.

The freezing pan 10 may be any conventional form of metal pan as now used as freezing trays in household refrigerators. As illustrated in the drawings, pan 10 is a one-piece drawn metal pan of sheet aluminum alloy having a flat bottom 11, outwardly flared side walls 12 and an inclined front wall 13. A U-shaped bracket 15 has a back plate 16 spot-welded to wall 13 at several points 17. The two legs 18 are integral with plate 16 and depend nearly vertically therefrom, and have aligned holes 19 adjacent their lower ends to serve as fixed journals for pin 20.

The integral swingable handle 30 shown in Figs. 1 and 2 may be any suitable molded plastic material, such as tenite for decorative effect. Handle 30 has an upper substantially horizontal portion 31, a normally upright main portion 32, and two strong flange portions 33 which straddle bracket 18 and substantially conceal it from view. Flange portions 33 have aligned holes 34 for bearing on pivot pin 20. The bottom portions of flanges 33 serve as pan-lifting cams 35, which preferably lie flush with the flat pan bottom 11 when the swingable handle 30 is in its raised normal position as shown in Figs. 1 and 2. Thus when pan 10 is set upon a flat refrigerated surface (indicated by line 36 in Fig. 2) and becomes frozen-bonded thereto the pan 10 may be readily released from its frozen bond by swinging handle 30 in the direction of the arrow in Fig. 2, since cams 35 are eccentric to pivot pin 20 and will pry the front end of pan 10 upwardly with a greatly multiplied force. This prying action will automatically occur whenever the operator pulls forward on the horizontal portion 31 of the handle to remove the pan from the freezing compartment of the refrigerator.

It will be noted that counter-clockwise (as viewed in Fig. 2) swinging of handle 30 can be easily limited by the handle 30 engaging the front end of the pan, but that no reasonable positive stop can be used to limit the downward swinging of handle 30 without danger of interfering with the full camming action of cams 35. Now according to this invention a relatively small resilient member 40 (of resilient rubber or similar rubber-like material) is mounted on pivot pin 20 to at all times urge handle 30 to its normal upright position yet readily permit the desired swinging action of handle 30 to provide full action of cams 35 as above described. Resilient member 40 has one end or lateral extension 41 thereof at all times pressing with the desired initial pressure against the shoulder 42 of handle 30, and the other end or lateral extension 43 thereof pressing against a portion of pan 10 (see Fig. 2). Member 40 may be very simply assembled with the other parts as follows: the holes in handle 30 and member 40 are lined up with the holes 19 in bracket 15 by slightly bending member 40 to bring its hole into alignment and then pin 20 is forced thru all the aligned holes. Preferably the hole in member 40 is made slightly less in diameter than pin 20 so that the resilient grip of member 40 on pin 20 will serve as the means to hold pin 20 against endwise displacement. Thus the final assembling of these parts will be a very simple economical operation and no further retaining means of any sort will be necessary. A further important function of resilient member 40 is to prevent looseness and consequent rattling of handle 30 or pin 20 against the pan or bracket 15 and to eliminate any necessity of close fitting of these parts.

Since resilient member 40 is rectilinear in shape, i. e. of uniform cross section from end to end thereof, it may be very economically made by first extruding a long strip of the resilient rubber or similar material to the desired section, curing said long strip, and then cutting said strip transversely to form a large number of individual members 40 from a single strip of stock. Fig. 3 illustrates such a long strip of stock 50 and the transverse cuts are indicated at 51 to form a plurality of the members 40 of any desired length. Figs. 1, 2 and 3 are drawn on full scale to represent an average size of present day ice trays. Obviously the members 40 are so small their cost will add very little indeed to the cost of the tray.

Figs. 4, 5 and 6 show a modified form of the invention. In this form prime reference numerals indicate parts equivalent to the parts marked with the same reference numerals (without prime marks) as described above. In this form the pan-lifter handle 30' is a simple S-shaped pressed metal piece having its pivot end bent up into an eye 60 to bear upon pin 20'. This eye 60 extends the full width of handle 30' except two slots 61 are provided therein for the two legs 18' of bracket 15', and a central slot 62 is provided therein for the resilient rubber member 40'.

Due to the thinness of shoulder 42' on the metal handle 30' the resilient member 40' is provided with a shouldered enlargement 63 on its outer end in order to better engage the swinging handle 30' and prevent possibility of member 40' from slipping off the handle 30' at shoulder 42'. The parts are assembled upon the bracket 15' in the same manner as described above for the first form of Figs. 1, 2 and 3. The shouldered enlargement 63 obviously facilitates the alignment of the hole in member 40' with the eye 60 in handle 30' for the forced insertion of pin 20' during assembling. In this form the width of member 40' is substantially less than the width of member 40 in the first form, and it is obvious from Fig. 5 that most of the yielding distortion of member 40' to permit the desired swinging of handle 30' will occur by a bending of the longer end or lateral extension of member 40'. In both forms however there is preferably some bending of the pan-engaging end or lateral extension of the resilient member when the handle is swung outwardly from the pan. In both forms the resilient member is assembled upon the handle with such an initial tension therein as to prevent rattling of the handle against the tray, and to always maintain the handle in its normal upright position except when the operator deliberately depresses the handle.

Fig. 6 illustrates how the resilient members 40' may be cut from a long blank 50' made by the extrusion method, as described above in connection with Fig. 3.

While the embodiment of the present invention as herein disclosed, constitutes a preferred form, it is to be understood that other forms might be adopted.

What is claimed is as follows:

1. A freezing pan having an end wall, a handle for said pan pivoted to said end wall on a horizontal pivot pin located adjacent the bottom portion thereof, said handle having a lower cam portion so arranged as to press down upon a horizontal supporting surface for said pan when the upper portion of said handle is swung outwardly from said end wall to forcibly lift said pan from said supporting surface, and a resilient rubber bar mounted upon said pivot pin and extending transversely thereof, said bar having its two opposed end portions pressing against said pan and said handle respectively in such manner that said handle is at all times yieldably urged inwardly toward said end wall to a generally upright position whereat said cam portion lies above said flat supporting surface.

2. A freezing pan having an end wall, a horizontal pivot pin mounted upon said end wall and offset therefrom adjacent the lower portion thereof, a handle for said pan swingably mounted upon said pivot pin from a generally vertical position to an outwardly swung position, said handle having a cam portion arranged to bear against a horizontal supporting surface for said pan when said handle is swung outwardly from said end wall to forcibly lift said pan from said supporting surface, and an elongated resilient rubber member having a constant cross section and a transverse hole therethru, said member being mounted upon said pivot pin by said pin passing thru said hole, said rubber member having opposed end portions pressing against said end wall and said handle respectively in such manner as to yieldable urge said handle to a generally upright position.

3. A freezing pan having an end wall, a pair of spaced bearing flanges attached to said end wall thereof and extending therefrom, a handle for said pan having bifurcated lower portions adapted to straddle said bearing flanges, a pin passing through said bifurcated portions of the handle and also through said bearing flanges to hingedly connect the handle to the end wall of the pan, said bifurcated portions of the handle having lower cam surfaces adapted to press down upon a horizontal supporting surface of said pan when the upper portion of said handle is swung outwardly from the end wall of the pan around said pin to forcibly lift the pan from said supporting surface, and an elongated resilient rubber-like member mounted on said pivot pin and between said bearing flanges, said resilient rubber-like member having lateral extensions thereon, one of which presses against the end wall of the pan and the other of which presses against the portion of said handle between the bifurcated portions thereof for yieldably retaining said handle swung inwardly toward said end wall.

ARTHUR J. FREI, Sr.

References Cited in the file of this patent

UNITED STATES PATENTS

| Number | Name | Date |
|---|---|---|
| 1,682,993 | Short | Sept. 4, 1924 |
| 2,222,401 | Carney | Nov. 19, 1940 |
| 2,285,712 | Geyer et al. | June 9, 1942 |
| 2,492,583 | Knupp | Dec. 27, 1949 |
| 2,576,591 | Geyer | Nov. 27, 1951 |